(12) United States Patent
Sasahara et al.

(10) Patent No.: US 12,332,607 B2
(45) Date of Patent: Jun. 17, 2025

(54) SEMICONDUCTOR IC, ELECTRONIC DEVICE, AND TIME DISPLAY METHOD

(71) Applicant: SEIKO EPSON CORPORATION, Tokyo (JP)

(72) Inventors: Hideo Sasahara, Suwa (JP); Eiji Kinoshita, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 914 days.

(21) Appl. No.: 17/082,486

(22) Filed: Oct. 28, 2020

(65) Prior Publication Data
US 2021/0132551 A1 May 6, 2021

(30) Foreign Application Priority Data
Oct. 30, 2019 (JP) .................................. 2019-197244

(51) Int. Cl.
G04G 21/04 (2013.01)
G01S 19/29 (2010.01)
G04G 9/00 (2006.01)

(52) U.S. Cl.
CPC .............. *G04G 21/04* (2013.01); *G01S 19/29* (2013.01); *G04G 9/00* (2013.01)

(58) Field of Classification Search
CPC ................................. G04G 9/00; G04G 21/04
See application file for complete search history.

(56) References Cited

U.S. PATENT DOCUMENTS

| | | | |
|---|---|---|---|
| 6,771,211 B2 | 8/2004 | Syrjarinne et al. | |
| 2003/0083814 A1* | 5/2003 | Gronemeyer | G04G 19/12 |
| | | | 701/478 |
| 2010/0194633 A1 | 8/2010 | Yamagata | |
| 2011/0084875 A1 | 4/2011 | Akiyama et al. | |
| 2014/0097983 A1 | 4/2014 | Akiyama et al. | |
| 2015/0146503 A1* | 5/2015 | Nakanishi | G04B 19/223 |
| | | | 368/21 |
| 2017/0199499 A1* | 7/2017 | Nakamura | G04R 20/30 |

FOREIGN PATENT DOCUMENTS

| | | |
|---|---|---|
| JP | 2000235067 A | 8/2000 |
| JP | 2010175426 A | 8/2010 |
| JP | 2012202814 A | 10/2012 |
| JP | 2014098711 A | 5/2014 |

OTHER PUBLICATIONS

Office Action for JP Patent Application No. JP 2019197244, issued on Mar. 22, 2023, 8 pages of Office Action.

* cited by examiner

*Primary Examiner* — Edwin A. Leon
*Assistant Examiner* — Sean R Brannon
(74) *Attorney, Agent, or Firm* — CHIP LAW GROUP

(57) ABSTRACT

An electronic device equipped with a communication device which is a GPS communication module is provided with a calculator, a specifying portion, and a display controller. The calculator calculates a position by Doppler positioning. The specifying portion specifies a time zone based on the position calculated by the calculator. The display controller causes a display device to display the time according to the time zone specified by the specifying portion.

7 Claims, 9 Drawing Sheets

SEMICONDUCTOR IC, ELECTRONIC DEVICE, AND TIME DISPLAY METHOD

The present application is based on, and claims priority from JP Application Serial Number 2019-197244, filed Oct. 30, 2019, the disclosure of which is hereby incorporated by reference herein in its entirety.

BACKGROUND

1. Technical Field

The present disclosure relates to a semiconductor IC, an electronic device, and a time display method.

2. Related Art

Specific examples of a positioning method in a global positioning system or global positioning satellite (GPS) include code phase positioning and Doppler positioning. In the code phase positioning, a distance between each of four GPS satellites whose positions are known and an electronic device targeted for positioning is obtained, and a three-dimensional coordinate value indicating a position of the electronic device is specified based on the distance. The reason why four GPS satellites are used is that the timepiece included in the electronic device is not always accurate and a time error on the electronic device side needs to be set as an unknown number in addition to the three-dimensional coordinate value indicating the position of the electronic device. The distance between the electronic device targeted for positioning and the GPS satellite can be obtained by multiplying the sum of the time required for a radio wave to reach the electronic device targeted for positioning from the GPS satellite and the time error in the electronic device by the speed of light. A value obtained by multiplying the time required for the radio wave to reach the electronic device targeted for positioning from the GPS satellite by the speed of light is called a pseudo distance. This pseudo distance is calculated as follows.

In the code phase positioning, if a moving speed of an electronic device equipped with a GPS communication module is assumed to be 150 km/h and the elapsed time from the previous positioning is within one hour, the position specified by the previous positioning is set as an initial position and the pseudo distance is calculated based on the initial position, a navigation message superimposed on a carrier wave of the radio wave transmitted from the GPS satellite, and a C/A code. In this case, an accuracy of the initial position is within 150 km. The C/A code is a PRN code that differs for each satellite, and a length of the C/A code is 1023 chips per millisecond, which is approximately 293 m per chip when converted to a distance. The pseudo distance is divided into an integer part corresponding to an integer multiple of the C/A code and a fractional part less than 1023 chips, and this fractional part is called a code phase. The code phase can be obtained by observing the radio wave received from the GPS satellite. On the other hand, the integer part is estimated based on the initial position and the position of the satellite obtained from the navigation message. The pseudo distance is calculated by adding the estimated integer part and the code phase obtained by the observation.

In contrast, when the elapsed time from the previous positioning exceeds one hour, the pseudo distance is calculated based on an arrival time required for the radio wave transmitted from the GPS satellite to reach the electronic device targeted for positioning. The reason why a position obtained by the previous positioning is not used when the elapsed time from the previous positioning exceeds one hour is that there is a possibility that a difference of more than 150 km between the position and an actual electronic device position is present and if the integer part is estimated using the position having the difference of more than 150 km, a big jump in which the position greatly changes compared to the previous positioning may occur. To calculate the arrival time, it is essential to decode ZCount broadcast from the satellite every six seconds in order to notify the current time. Depending on a type and usage of the electronic device targeted for positioning, the elapsed time from the previous positioning often exceeds one hour. Since it takes about six seconds to decode ZCount, in code phase positioning, if the elapsed time from the previous positioning exceeds one hour, a waiting time of approximately six seconds occurs before the positioning is performed.

In Doppler positioning, the position of the electronic device is directly calculated from a difference between a frequency at the time of transmission of the radio wave transmitted by the GPS satellite and a frequency of the radio wave received by the electronic device targeted for positioning. In Doppler positioning, the accuracy of the initial position does not matter, and decoding of ZCount is not needed. For that reason, according to Doppler positioning, positioning can be performed immediately. U.S. Pat. No. 6,771,211 describes that a pseudo distance in the code phase positioning is calculated by setting a position obtained by Doppler positioning as an initial position. By setting the position obtained by Doppler positioning as the initial position in the code phase positioning, it is possible to avoid an occurrence of waiting time even when the elapsed time from the previous positioning exceeds one hour.

Although a computation amount required for Doppler positioning is larger than the computation amount required for the code phase positioning, the accuracy of the position obtained by Doppler positioning is lower than the accuracy of the position obtained by the code phase positioning. The reason why the code phase positioning is performed by using the position obtained by Doppler positioning as the initial position as in the technique disclosed in U.S. Pat. No. 6,771,211 is that it is considered that a sufficient accuracy cannot be obtained only by Doppler positioning. However, Doppler positioning may be sufficient depending on the type of electronic device targeted for positioning and how to use the positioning result. Performing the code phase positioning, irrespective of the fact that Doppler positioning alone is sufficient, is of excessive quality, which is not preferable.

SUMMARY

In order to solve the problems described above, a semiconductor IC according to an aspect of the present disclosure includes a calculator that calculates a position by Doppler positioning using a radio wave transmitted from a satellite, a specifying portion that specifies a time zone based on the position calculated by the calculator, and a display controller that displays a time according to the time zone specified by the specifying portion on a display device.

In order to solve the problems described above, a semiconductor IC according to another aspect of the present disclosure includes a calculator that calculates a position by Doppler positioning using a radio wave transmitted from a satellite, a verifying portion that verifies, using a code phase, whether or not an accuracy of the position calculated by the calculator corresponds to an accuracy that deviates from a time zone, a specifying portion that specifies the time zone based on the position verified by the verifying portion that the accuracy does not deviate from the time zone, and a display controller that displays the time according to the time zone specified by the specifying portion on a display device.

In order to solve the problems described above, a semiconductor IC according to another aspect of the present disclosure includes a calculator that calculates a position by Doppler positioning using a radio wave transmitted from a satellite, a verifying portion that verifies whether or not a distance of the position calculated by the calculator from a boundary of a time zone is equal to or greater than a predetermined threshold value, a specifying portion that specifies the time zone based on the position verified by the verifying portion that the distance from the boundary is equal to or greater than the predetermined threshold value, and a display controller that displays the time according to the time zone specified by the specifying portion on a display device.

In order to solve the problems described above, an electronic device according to another aspect of the present disclosure includes the semiconductor IC, and a communication module that receives a radio wave transmitted from a satellite.

In order to solve the problems described above, a time display method according to another aspect of the present disclosure includes obtaining a position by Doppler positioning using a radio wave transmitted from a satellite, specifying a time zone based on the position obtained by the Doppler positioning, and displaying a time according to the specified time zone.

In order to solve the problems described above, a time display method according to another aspect of the present disclosure includes obtaining a position by Doppler positioning using a radio wave transmitted from a satellite, verifying, using a code phase, whether or not an accuracy of the position obtained by the Doppler positioning corresponds to an accuracy that deviates from the time zone, when the accuracy does not deviate from the time zone, specifying the time zone based on the position obtained by the Doppler positioning, and displaying a time according to the specified time zone.

In order to solve the problems described above, a time display method according to another aspect of the present disclosure includes obtaining a position by Doppler positioning using a radio wave transmitted from a satellite, verifying whether or not a distance of the position obtained by the Doppler positioning from a boundary of a time zone is equal to or greater than a predetermined threshold value, when the distance from the boundary is equal to or greater than the predetermined threshold value, specifying the time zone based on the position obtained by the Doppler positioning, and displaying a time according to the specified time zone.

DESCRIPTION OF EXEMPLARY EMBODIMENTS

Hereinafter, embodiments will be described with reference to the accompanying drawings. Various technically preferable limitations are given to the embodiments described below, but the embodiments are not limited to these aspects.

1. First Embodiment

Figure 1:
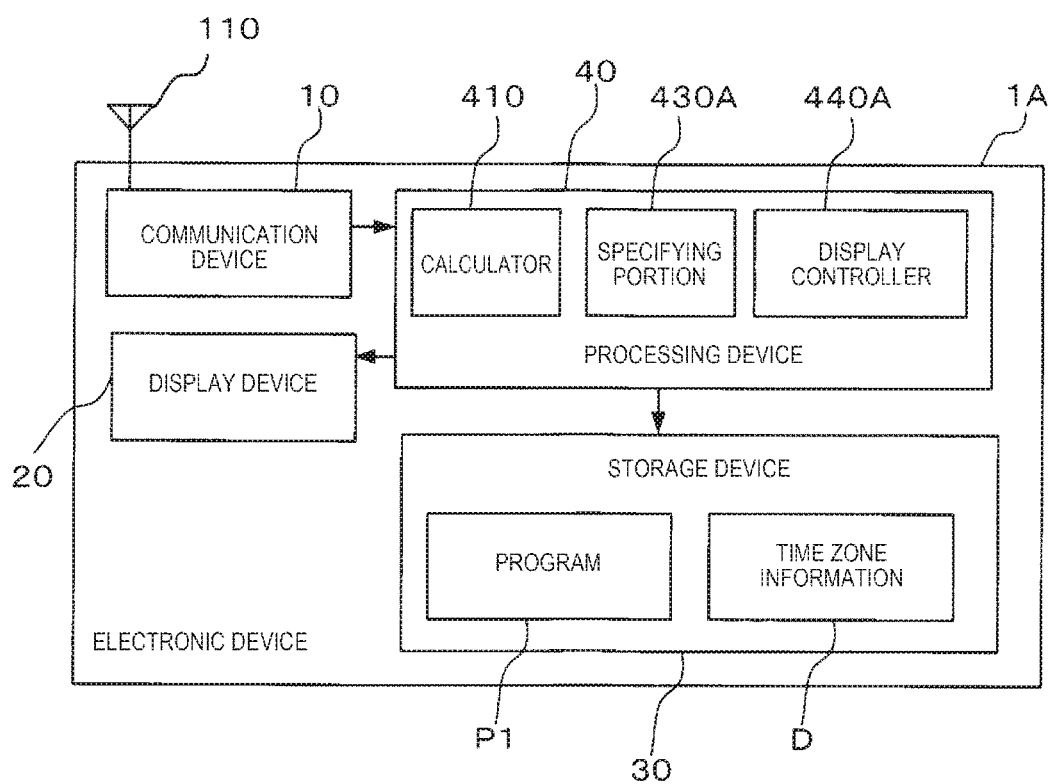
FIG. 1 is a block diagram illustrating an electrical configuration example of an electronic device according to a first embodiment of the present disclosure.

FIG. 1 is a block diagram illustrating a configuration of an electronic device 1A according to a first embodiment of the present disclosure. The electronic device 1A is a timepiece having a function of specifying a position of the electronic device 1A based on a radio wave transmitted from a GPS satellite and displaying the time according to a time zone including the position. The time zone refers to an equal time zone that uses the same standard time. In addition to the electronic device 1A, a GPS satellite 2A, a GPS satellite 2B, a GPS satellite 2C, and a GPS satellite 2D among twenty four GPS satellites included in the GPS are illustrated in FIG. 1. Hereinafter, when it is not necessary to distinguish between the GPS satellite 2A, the GPS satellite 2B, the GPS satellite 2C, and the GPS satellite 2D, the GPS satellites are denoted as a GPS satellite 2.

As illustrated in FIG. 1, the electronic device 1A includes a communication device 10, a display device 20, a storage device 30, and a processing device 40. The electronic device 1A includes an input device that allows a user to input various instructions and a timing device that measures time, in addition to the communication device 10, the display device 20, the storage device 30, and the processing device 40. However, since the input device and the timing device have little relation to the present disclosure, illustration thereof is omitted in FIG. 1. Hereinafter, detailed description of the input device and the timing device will be omitted.

Although not illustrated in detail in FIG. 1, the communication device 10 is coupled to the processing device 40 via an interface such as UART, SPI, or I2C. The communication device 10 is coupled to an antenna 110 that receives a radio wave transmitted from the GPS satellite 2. The communication device 10 is a GPS communication module that demodulates information superimposed on the radio wave received by the antenna 110.

Under the control of the processing device 40, the communication device 10 outputs frequency information indicating a frequency of the radio wave received by the antenna 110 and information superimposed on the received radio wave to the processing device 40. Specific examples of the information superimposed on the radio waves received by the antenna 110 include a C/A code and a navigation message. The C/A code is a PRN code that differs for each GPS satellite. A length of the C/A code is 1023 chips per millisecond, which is approximately 293 m per chip when converted to a distance. The navigation message is used to specify the position and moving speed of the GPS satellite 2 that is a transmission source of the navigation message.

The display device 20 is, for example, a liquid crystal display. The display device 20 displays various types of information under the control of the processing device 40. Specific examples of the information displayed on the display device 20 in this embodiment include the time in a time zone according to the position of the electronic device 1A.

The storage device 30 includes a read only memory (ROM) and a random access memory (RAM). A program P1 for causing the processing device 40 to execute a time display method according to the present disclosure is stored in the storage device 30 in advance. The storage device 30 stores time zone information D indicating a boundary of each of a plurality of equal time zones in advance.

The processing device 40 is configured to include a processor such as a central processing unit (CPU). The processing device 40 may be configured with a single processor or may be configured with a plurality of processors. The processing device 40 may include the storage device 30, and the processing device 40 may be integrated with the communication device 10. The processing device 40 starts executing the program P1 when the power of the electronic device 1A is turned on, and controls each portion of the electronic device 1A. The processing device 40 being operated according to the program P1 functions as a calculator 410, a specifying portion 430A, and a display controller 440A. The calculator 410, the specifying portion 430A, and the display controller 440A in this embodiment are software modules realized by causing the processing device 40 to be operated according to the program P1.

The calculator 410 calculates the position of the electronic device 1A by Doppler positioning. More specifically, the calculator 410 calculates a frequency difference between a frequency of a radio wave received from the GPS satellite 2A and a frequency when the radio wave is transmitted. Similarly, the calculator 410 calculates a frequency difference between the frequency of the radio wave received from each of the GPS satellite 2B, the GPS satellite 2C, and the GPS satellite 2D and the frequency when the radio wave is transmitted. Then, the calculator 410 calculates the position of the electronic device 1A from the four frequency differences calculated in the manner as described above and the position and moving speed of each of the GPS satellite 2A, the GPS satellite 2B, the GPS satellite 2C, and the GPS satellite 2D.

Figure 2:
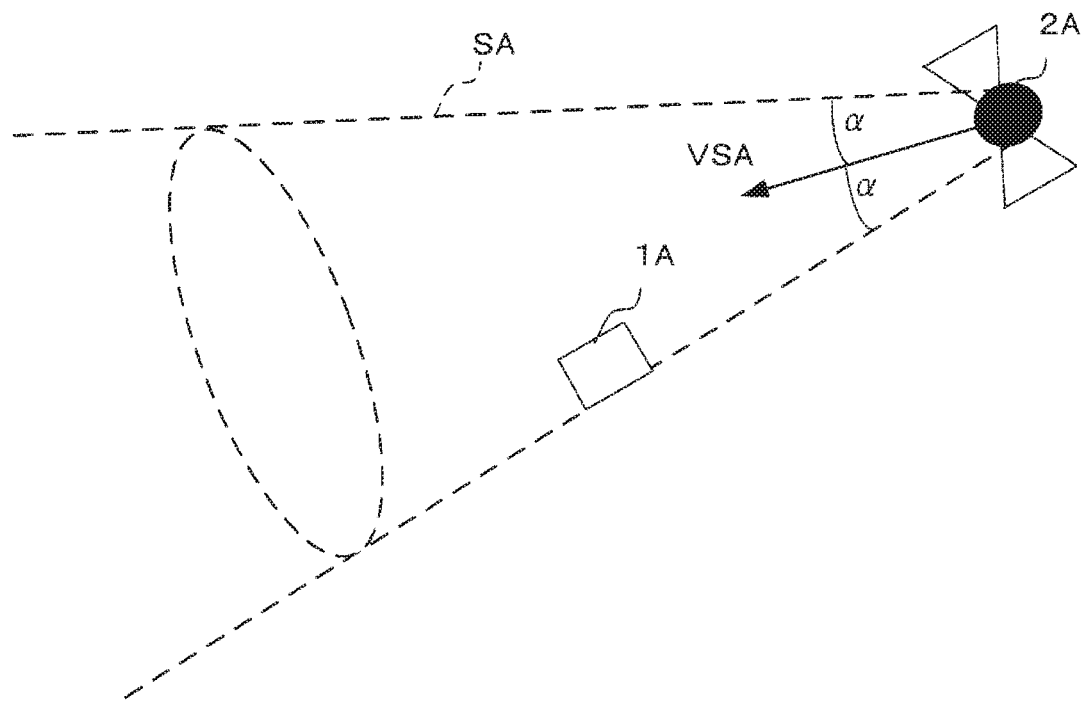
FIG. 2 is a diagram for illustrating Doppler positioning.

For example, the position of the electronic device 1A specified using the radio wave received from the GPS satellite 2A is the position on a conical surface SA indicated by the broken line in FIG. 2. VSA in FIG. 2 means the moving speed of the GPS satellite 2A. An angle α in FIG. 2 is an angle between a vector from the position of the GPS satellite 2A to any position on the conical surface SA and a vector representing the moving speed of the GPS satellite 2A. The calculator 410 generates a mathematical expression illustrated in the following expression (1) for each of the GPS satellite 2A, the GPS satellite 2B, the GPS satellite 2C, and the GPS satellite 2D. In the expression (1) below, a subscript i means any of A, B, C and D. In the following expression (1), $VS_i$ is a vector representing the moving speed of the GPS satellite 2 indicated by the subscript i, and $PS_i$ is a vector representing the position of the GPS satellite 2 indicated by the subscript i. $VS_i$ and $PS_i$ are known values obtained from the navigation message. In the following expression (1), $d_i$ is a value obtained by multiplying the GPS satellite 2 indicated by the subscript i and the magnitude of the moving speed by the cosine of the angle α, P is a vector indicating the position of the electronic device 1A, and V is a vector representing the moving speed of the electronic device 1A.

$$d_i = \frac{(PS_i - P)}{|PS_i - P|} \cdot (VS_i - V) \qquad (1)$$

Then, the calculator 410 obtains a velocity difference ($VS_i$-V) on the right side of the expression (1) from the frequency difference for the GPS satellite 2 indicated by the subscript i, makes the expression (1) generated for each of the GPS satellite 2A, the GPS satellite 2B, the GPS satellite 2C, and the GPS satellite 2D simultaneous, and solves the expression (1) for P, thereby calculating the position of the electronic device 1A. The reason why the four GPS satellites 2 are used is that the observed $d_i$ includes a clock drift in the electronic device 1A and estimation of four parameters of the position P (x, y, z) of the electronic device 1A and the clock drift is needed. Although the calculator 410 of this embodiment calculates the position of the electronic device 1A by Doppler positioning using the radio waves received from four GPS satellites 2, the position of the device 1A may be calculated by Doppler positioning using radio waves received from five or more GPS satellites 2.

The specifying portion 430A specifies the time zone in which the electronic device 1A is positioned from time zone information D and the position calculated by calculator 410. Then, the display controller 440A converts the time measured by the timing device into the time according to the time zone specified by the specifying portion 430A and causes the display device 20 to display the converted time.

Figure 3:
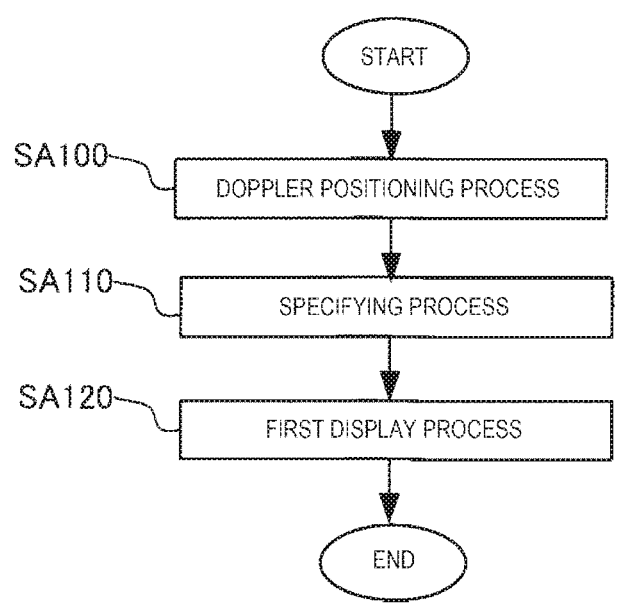
FIG. 3 is a flowchart illustrating a flow of a time display method executed by a processing device according to a program in the electronic device.

The processing device 40 being operated according to the program P1 periodically executes the time display method according to the present disclosure. FIG. 3 is a flowchart illustrating a flow of the time display method executed by the processing device 40 according to the program P1. As illustrated in FIG. 3, the time display method in this embodiment includes a Doppler positioning process SA100, a specifying process SA110, and a first display process SA120.

In the Doppler positioning process SA100, the processing device 40 functions as the calculator 410 and executes Doppler positioning. The position of the electronic device 1A is obtained by this Doppler positioning. In the specifying process SA110, the processing device 40 functions as the specifying portion 430A. In the specifying process SA110, the processing device 40 specifies the time zone in which the electronic device 1A is positioned from the time zone information D and the position calculated in the Doppler positioning process SA100. In the first display process SA120, the processing device 40 functions as the display controller 440A. In the first display process SA120, the processing device 40 causes the display device 20 to display the time according to the time zone specified in the specifying process SA110.

Figure 4:
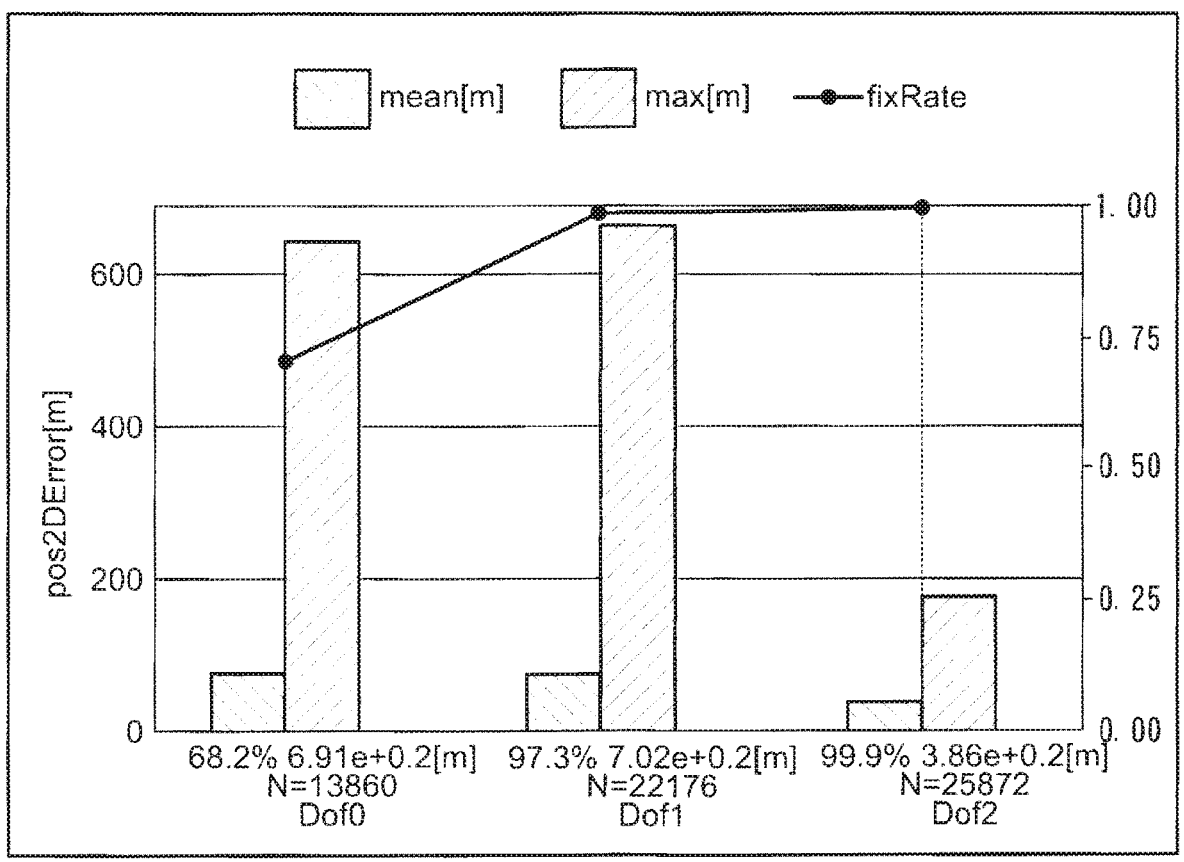
FIG. 4 is a graph illustrating an example of a simulation result regarding an accuracy of Doppler positioning.

As described above, the accuracy of the position obtained by Doppler positioning is lower than the accuracy of the position obtained by code phase positioning. However, according to a simulation conducted by the inventor of the present application, it is found that if the electronic device 1A is outdoors and the electronic device 1A is stationary, the accuracy of the position obtained by Doppler positioning can be sufficiently used for specifying the time zone. FIG. 4 is a graph illustrating the result of this simulation. As illustrated in FIG. 4, if the electronic device 1A is outdoors and the electronic device 1A is stationary, the maximum error included in the position obtained by Doppler positioning using the four GPS satellites 2 is approximately 700 m. Regarding the specification of the time zone, no particular problem occurs even if the position of the electronic device 1A includes an error of approximately several km. Accordingly, the accuracy of the position obtained by Doppler positioning can be sufficiently used for specifying the time zone.

As described above, in the electronic device 1A according to this embodiment, the time zone is specified based on the positioning result by Doppler positioning and the code phase positioning is not performed, and thus it becomes possible to display the time according to the time zone while avoiding excessive quality.

2. Second Embodiment

Figure 5:
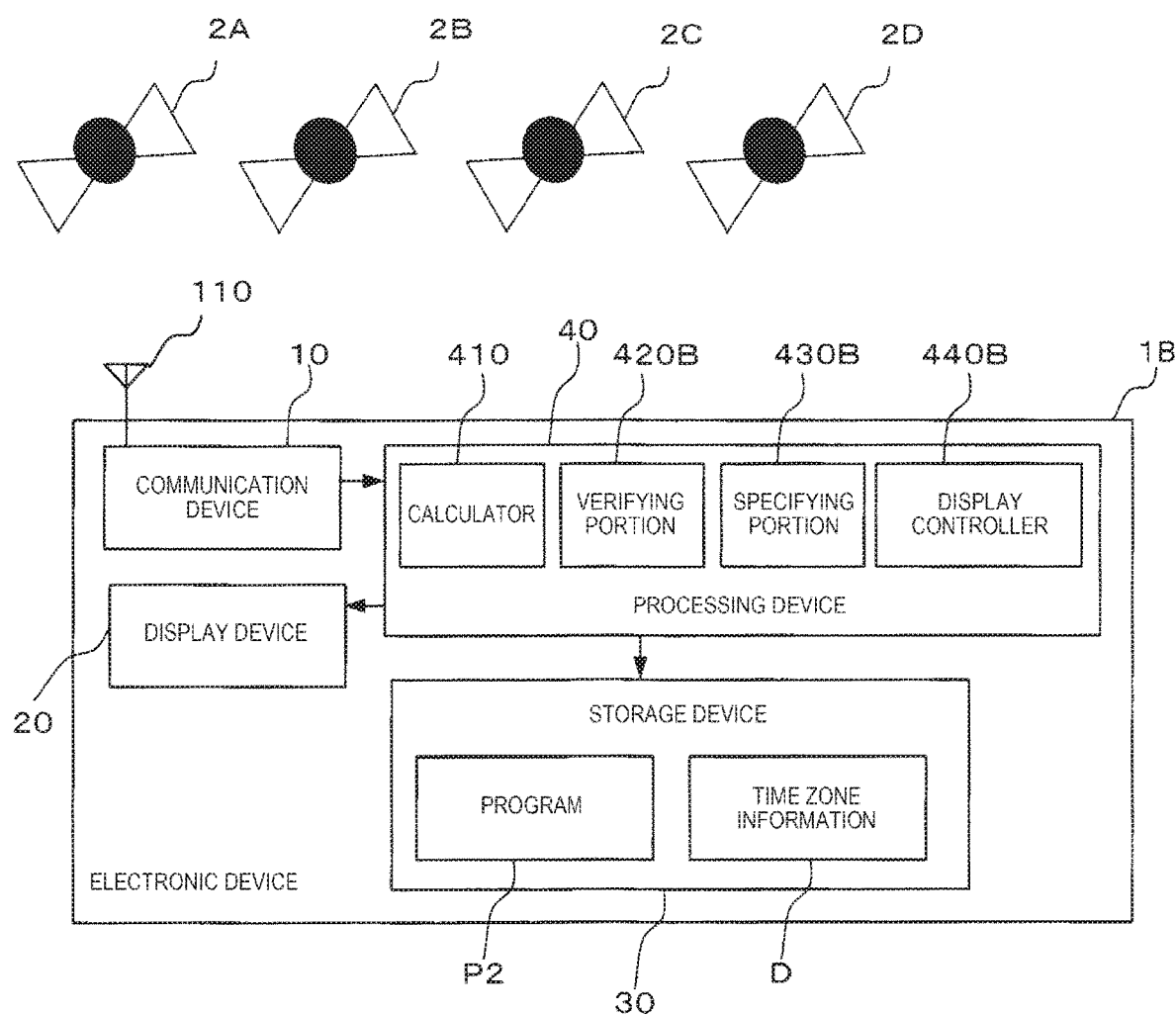
FIG. 5 is a block diagram illustrating an electrical configuration example of an electronic device according to a second embodiment of the present disclosure.

FIG. 5 is a block diagram illustrating an electrical configuration example of an electronic device 1B. In FIG. 5, the same components as those in FIG. 1 are denoted by the same reference numerals. As is clear from a comparison between FIG. 5 and FIG. 1, a program P2 is stored in the storage device 30 of the electronic device 1B instead of the program P1. In the electronic device 1B, the calculator 410, a verifying portion 420B, a specifying portion 430B, and a display controller 440B are realized by operating the processing device 40 according to the program P2. The calculator 410, the verifying portion 420B, the specifying portion 430B, and the display controller 440B in this embodiment are also software modules. The function of the calculator 410 is the same as in the first embodiment. Hereinafter, the verifying portion 420B, the specifying portion 430B, and the display controller 440B will be mainly described.

Figure 6:
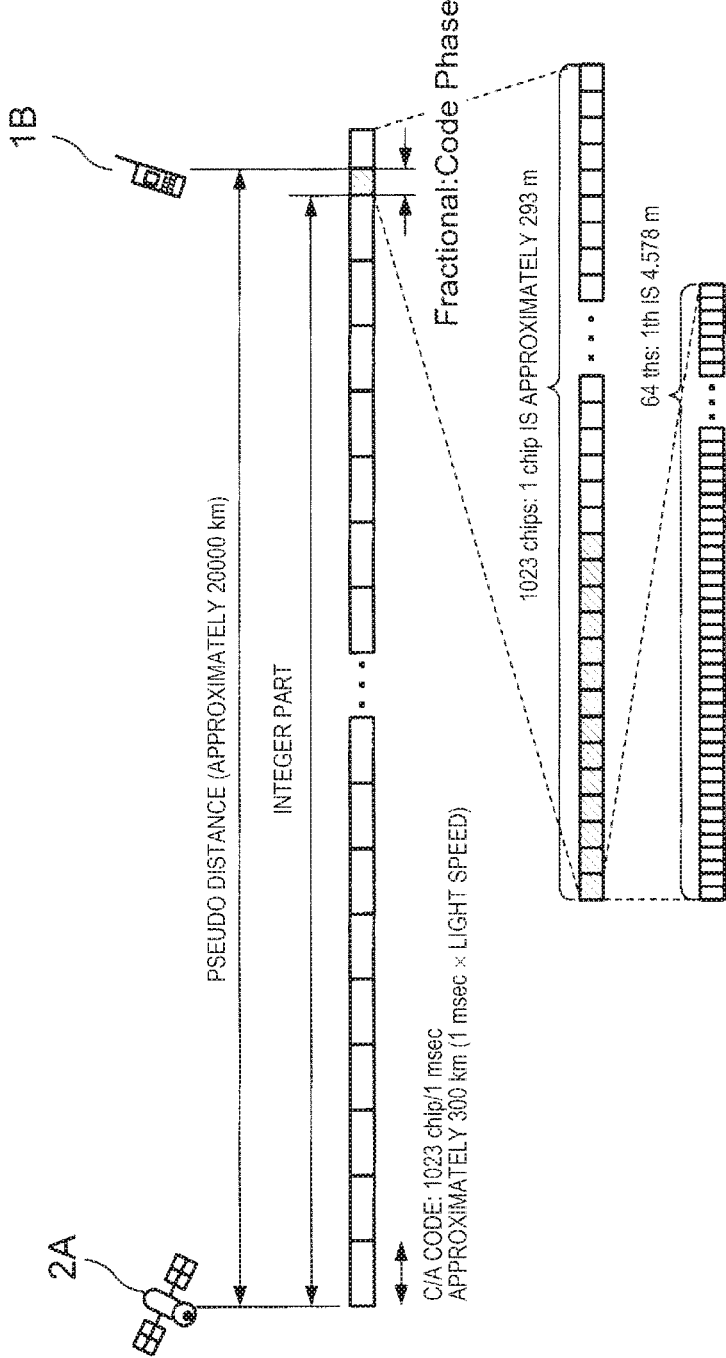
FIG. 6 is a diagram illustrating a relationship between a pseudo distance between an electronic device targeted for positioning and a GPS satellite, a code phase, and a C/A code.

The verifying portion 420B verifies, using the code phase, whether or not the accuracy of the position calculated by the calculator 410 corresponds to an accuracy that deviates from the time zone. More specifically, the verifying portion 420B first calculates a first code phase from a position of the GPS satellite 2A and the position calculated by the calculator 410. The pseudo distance between the electronic device 1B and the GPS satellite 2A, the code phase, and the C/A code have the relationship illustrated in FIG. 6. The verifying portion 420B calculates a candidate value of the pseudo distance between the GPS satellite 2A and the electronic device 1B from the position of the GPS satellite 2A and the position calculated by the calculator 410, and sets the remainder obtained by dividing this candidate value by the length of the C/A code as the first code phase. Similarly, the verifying portion 420B calculates a second code phase from the position of the GPS satellite 2B and the position calculated by the calculator 410, calculates a third code phase from the position of the GPS satellite 2C and the position calculated by the calculator 410, and calculates a fourth code phase from the position of the GPS satellite 2D and the position calculated by the calculator 410.

Next, the verifying portion 420B calculates a first difference, which is a difference between the first code phase and a code phase obtained by observing the radio wave transmitted from the GPS satellite 2A. Similarly, the verifying portion 420B calculates a second difference, which is a difference between the second code phase and the code phase obtained by observing the radio wave transmitted from the GPS satellite 2B, a third difference, which is a difference between the third code phase and the code phase obtained by observing the radio wave transmitted from the GPS satellite 2C, and a fourth difference, which is a difference between the fourth code phase and the code phase obtained by observing the radio wave transmitted from the GPS satellite 2D.

Then, the verifying portion 420B calculates an index value indicating the magnitude of variation in the first code phase, the second code phase, the third code phase, and the fourth code phase from the four differences obtained in the manner as described above. More specifically, the verifying portion 420B calculates an index value that decreases as variation in the first code phase, the second code phase, the third code phase, and the fourth code phase decreases. Accordingly, the index value when variation in the first chord phase, the second chord phase, the third chord phase, and the fourth chord phase is small is smaller than the index value when variation in the first code phase, the second code phase, the third code phase, and the fourth cord phase is large. In this embodiment, the verifying portion 420B calculates standard deviation of the four differences as the index value.

In this embodiment, based on the index value calculated in the manner as described above, it is verified whether or not the accuracy of the position calculated by the calculator 410 corresponds to an accuracy that deviates from the time zone. Specifically, if the index value is equal to or less than a predetermined threshold value, the verifying portion 420B determines that the accuracy of the position calculated by the calculator 410 corresponds to an accuracy that does not deviate from the time zone, and if the index value is larger than the predetermined threshold value, the verifying portion 420B determines that the accuracy corresponds to an accuracy that deviates from the time zone. The reason why it is possible to verify, using the index value indicating the magnitude of variation in the first code phase, the second code phase, the third code phase, and the fourth code phase, whether or not the accuracy of the position calculated by the calculator 410 corresponds to the accuracy that deviates from the time zone is as follows.

Figure 7:
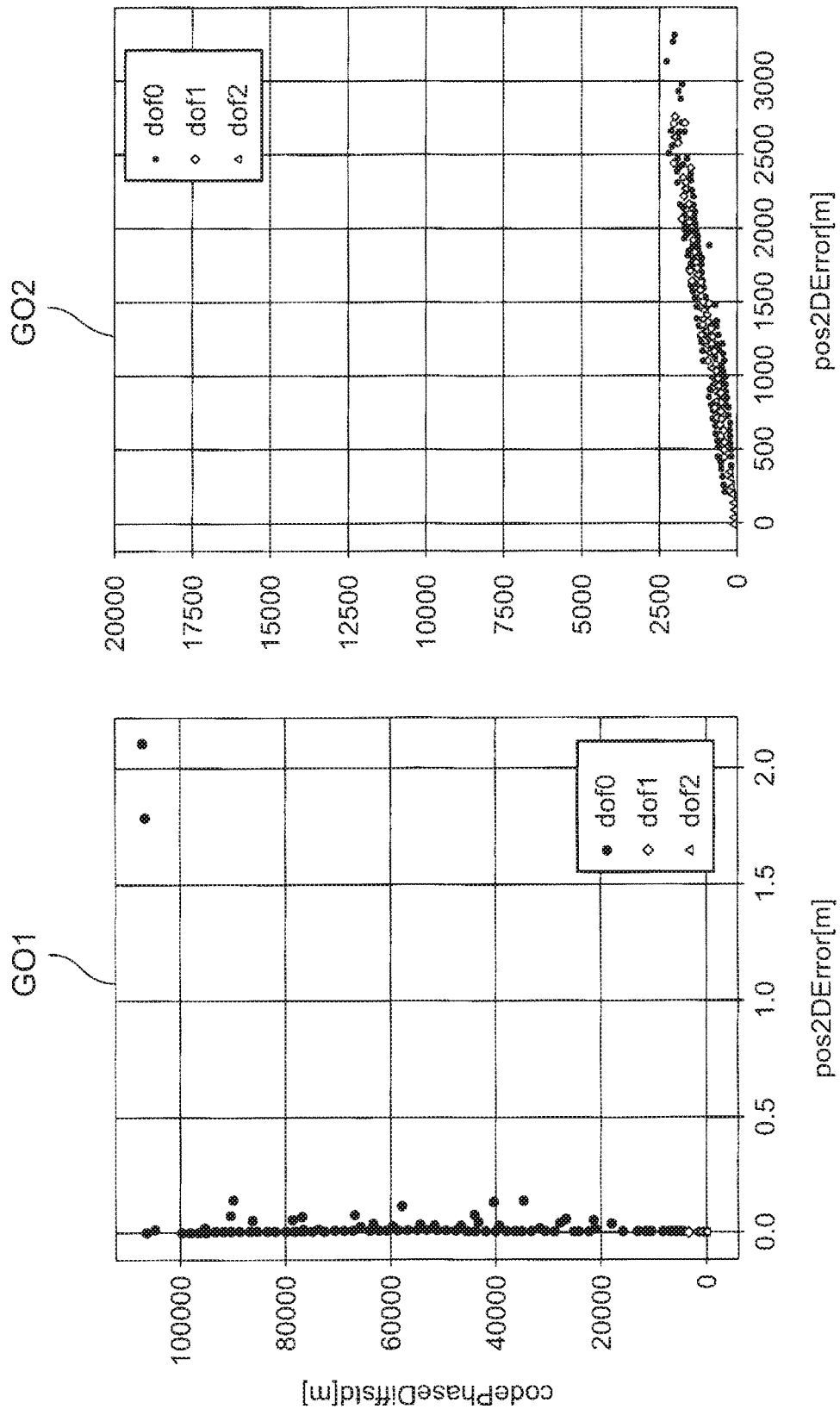
FIG. 7 is a graph illustrating a relationship between variation in the code phase and the accuracy of Doppler positioning.

Graphs G01 and G02 illustrated in FIG. 7 illustrate a relationship between standard deviation, which is an example of the index value, and an error included in the position obtained by Doppler positioning. The graph G02 is a graph in which a portion, whose standard deviation in the graph G01 is 20000 or less, is expanded. As illustrated in the graph G02 of FIG. 7, there is a strong correlation between the index value indicating the magnitude of variation in the first code phase, the second code phase, the third code phase, and the fourth code phase and the magnitude of the error included in the position obtained by Doppler positioning. Specifically, an error included in the position obtained by Doppler positioning when the index value is small is smaller than an error included in the position when the index value is large. As described above, the index value indicating the magnitude of variation in the first code phase, the second code phase, the third code phase, and the fourth code phase represents the magnitude of the error included in the position calculated by the calculator 410. Accordingly, by referring to this index value, it is verified whether or not the accuracy of the position calculated by the calculator 410 corresponds to the accuracy that deviates from the time zone.

The specifying portion 430B specifies the time zone based on the position that is verified by the verifying portion 420B to have an accuracy that does not deviate from the time zone. In the embodiment, the display controller 440B causes the display device 20 to display the time according to the time zone specified based on the position verified to have the accuracy that does not deviate from the time zone. In contrast, when a verification result that the position calculated by the calculator 410 has the accuracy that deviates from the time zone is obtained, the display controller 440B causes the display device 20 to display a message indicating that the position obtained by the positioning has the accuracy that deviates from the time zone.

Figure 8:
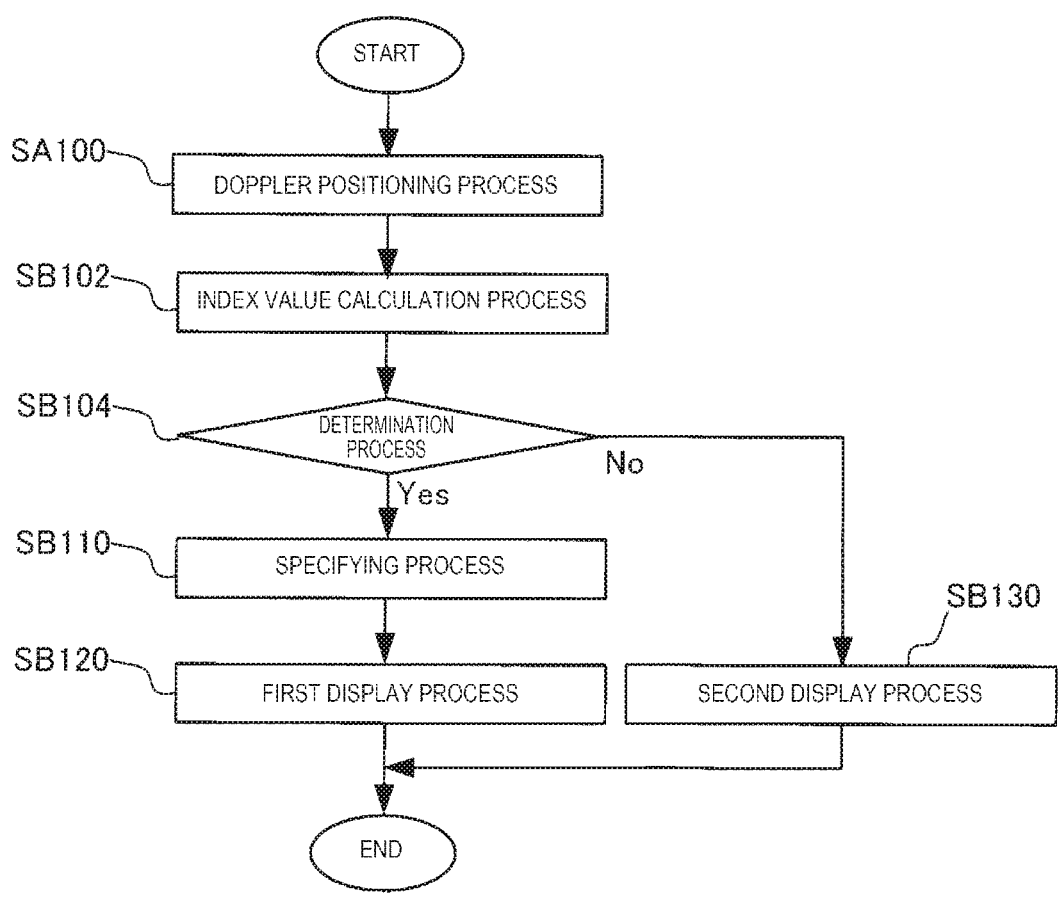
FIG. 8 is a flowchart illustrating a flow of a time display method executed by the processing device according to a program in an electronic device.

The processing device 40 being operated according to the program P2 executes a time display method illustrated in FIG. 8. As illustrated in FIG. 8, the time display method in this embodiment includes the Doppler positioning process SA100, an index value calculation process SB102, a determination process SB104, a specifying process SB110, a first display process SB120, and a second display process SB130. Hereinafter, the index value calculation process SB102, the determination process SB104, the specifying process SB110, the first display process SB120, and the second display process SB130 that are different from the time display method in the first embodiment will be mainly described.

In the index value calculation process SB102 and the determination process SB104, the processing device 40 functions as the verifying portion 420B. In the index value calculation process SB102, the processing device 40 calculates an index value indicating the magnitude of variation in the first code phase, the second code phase, the third code phase, and the fourth code phase. In the determination process SB104, the processing device 40 determines whether or not the index value calculated in the index value calculation process SB102 is less than or equal to a predetermined threshold value. When it is determined that the determination result in the determination process SB104 is "Yes", the processing device 40 executes the specifying process SB110 and the first display process SB120. When it is determined that the determination result in the determination process SB104 is "No", the processing device 40 executes the second display process SB130.

In the specifying process SB110, the processing device 40 functions as the specifying portion 430B. In the specifying portion 430B, the processing device 40 specifies the time zone based on the position that is verified by the verifying portion 420B to have an accuracy that does not deviate from the time zone. In the first display process SB120 subsequent to the specifying process SB110, the processing device 40 functions as the display controller 440B and causes the display device 20 to display the time according to the time zone specified in the specifying process SB110. In the second display process SB130, the processing device 40 functions as the display controller 440B, and causes the display device 20 to display a message indicating that the position obtained by the positioning has the accuracy that deviates from the time zone.

As described above, according to the electronic device 1B of this embodiment, verification whether or not the positioning result by Doppler positioning has the accuracy that does not deviate from the time zone is performed based on variation in the code phase, and the time according to the time zone specified based on the verified position is displayed on the display device 20. In this embodiment, although the verification of the positioning result by Doppler positioning is performed based on variation in the code phase, the code phase positioning is not performed. For that reason, the electronic device 1B according to this embodiment can also display the time according to the time zone while avoiding excessive quality.

In this embodiment, although the second display process SB130 is executed when the determination result in the determination process SB104 is "No", the second display process SB130 may be omitted, or a modification may be made so that the specifying process SB110 and the first display process SB120 are executed in addition to the second display process SB130. According to the latter aspect, it is possible to cause the display device 20 to display the time according to the time zone specified based on the position obtained by positioning while displaying a message indicating that the position has an accuracy that deviates from the time zone on the display device 20. When the determination result in the determination process SB104 is "No", the code phase positioning may be performed, the time zone may be specified based on the position obtained by the code phase positioning, and the time according to the time zone may be displayed on the display device 20.

3. Third Embodiment

Figure 9:
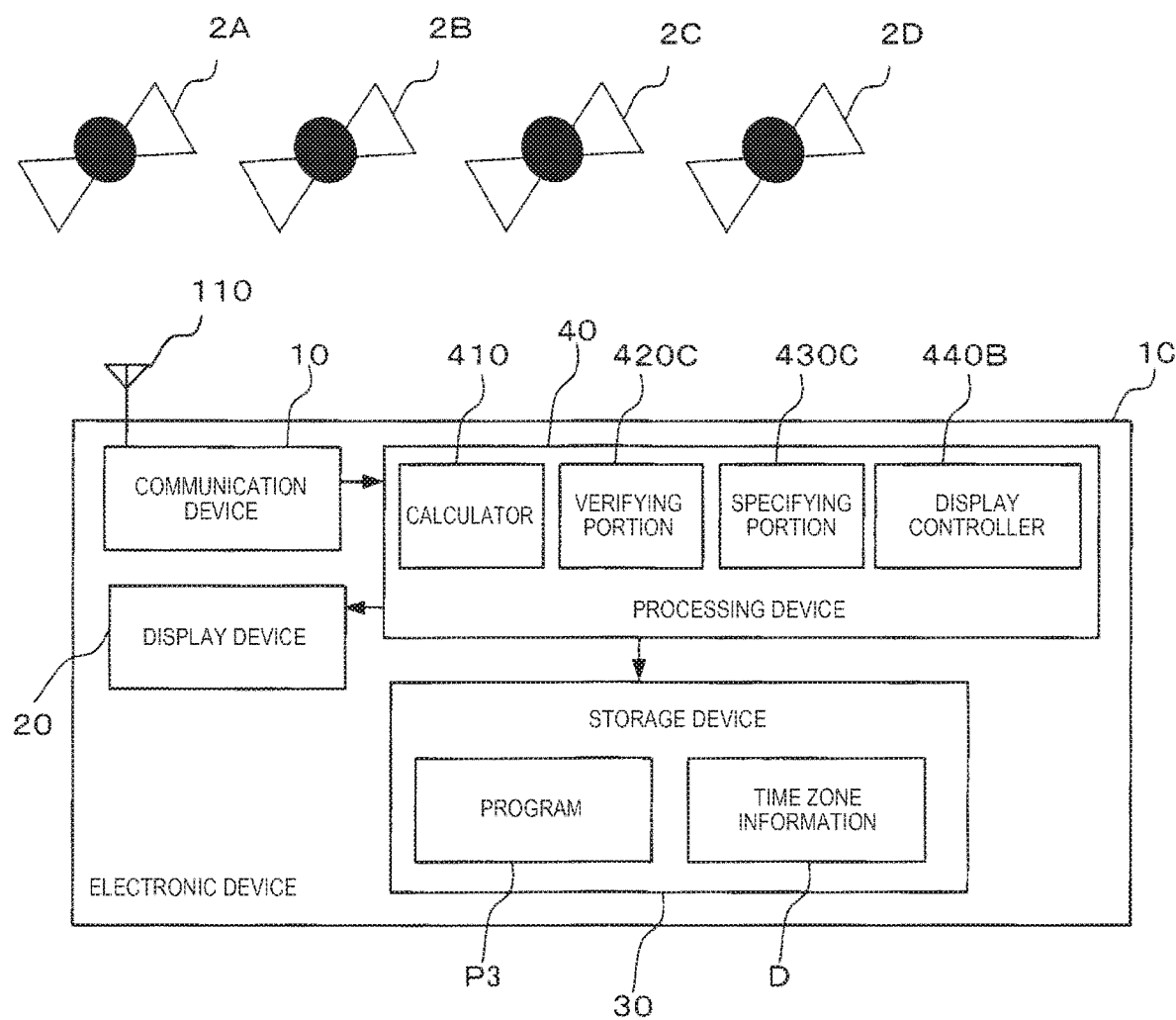
FIG. 9 is a block diagram illustrating an electrical configuration example of an electronic device according to a third embodiment of the present disclosure.

FIG. 9 is a block diagram illustrating an electrical configuration example of an electronic device 1C according to a third embodiment of the present disclosure. In FIG. 9, the same components as those in FIG. 5 are denoted by the same reference numerals. As is clear from comparison between FIG. 9 and FIG. 5, a program P3 is stored in the storage device 30 of the electronic device 1C instead of the program P2. In the electronic device 1C, the calculator 410, a verifying portion 420C, a specifying portion 430C, and the display controller 440B are realized by operating the processing device 40 according to the program P3. The calculator 410, the verifying portion 420C, the specifying portion 430C, and the display controller 440B in this embodiment are also software modules. The function of the calculator 410 is the same as that of the first and second embodiments, and thus the verifying portion 420C and the specifying portion 430C will be mainly described below.

The verifying portion 420C verifies whether or not the distance from the boundary of the time zone of the position calculated by the calculator 410 is equal to or greater than a predetermined threshold value. The specifying portion 430C specifies the time zone based on the position which is verified that the distance from the boundary is equal to or greater than the predetermined threshold value. In the embodiment, the display controller 440B causes the display device 20 to display the time according to the time zone specified based on the position separated from the boundary of the time zone by the distance equal to or greater than the predetermined threshold value. In contrast, when the distance from the boundary of the time zone of the position calculated by the calculator 410 is less than the predetermined threshold, the display controller 440B causes the display device 20 to display a message indicating that the position obtained by the positioning is not separated from the boundary of the time zone by the predetermined threshold value or more.

Specific examples of the threshold value include 700 m. Even if the electronic device 1C is outdoors and stationary, the position of the electronic device 1C obtained by Doppler positioning includes an error of approximately 700 m. If the distance from the boundary of the time zone of a position calculated by the calculator 410 is 700 m or less, an erroneous time zone may be specified based on the position. For that reason, in this embodiment, it is verified whether or not the distance from the boundary of the time zone of the position calculated by the calculator 410 is equal to or greater than a predetermined threshold, and if the distance from the boundary is equal to or greater than the predetermined threshold value, the time zone is specified based on the verified position. Although the threshold value in this embodiment is a fixed value, a measurement device for measuring the moving speed of the electronic device 1C may be provided in the electronic device 1C, and the verifying portion 420C may be caused to adjust the threshold value according to the moving speed measured by the measurement device. Specifically, it is conceivable that the threshold value when the moving speed of the electronic device 1C is high is made larger than the threshold value when the moving speed of the electronic device 1C is low. This is because the higher the moving speed of the electronic device 1C, the larger the error included in the electrical position obtained by Doppler positioning. Specific examples of the measurement device that measures the moving speed of the electronic device 1C is a speed sensor or an acceleration sensor.

Figure 10:
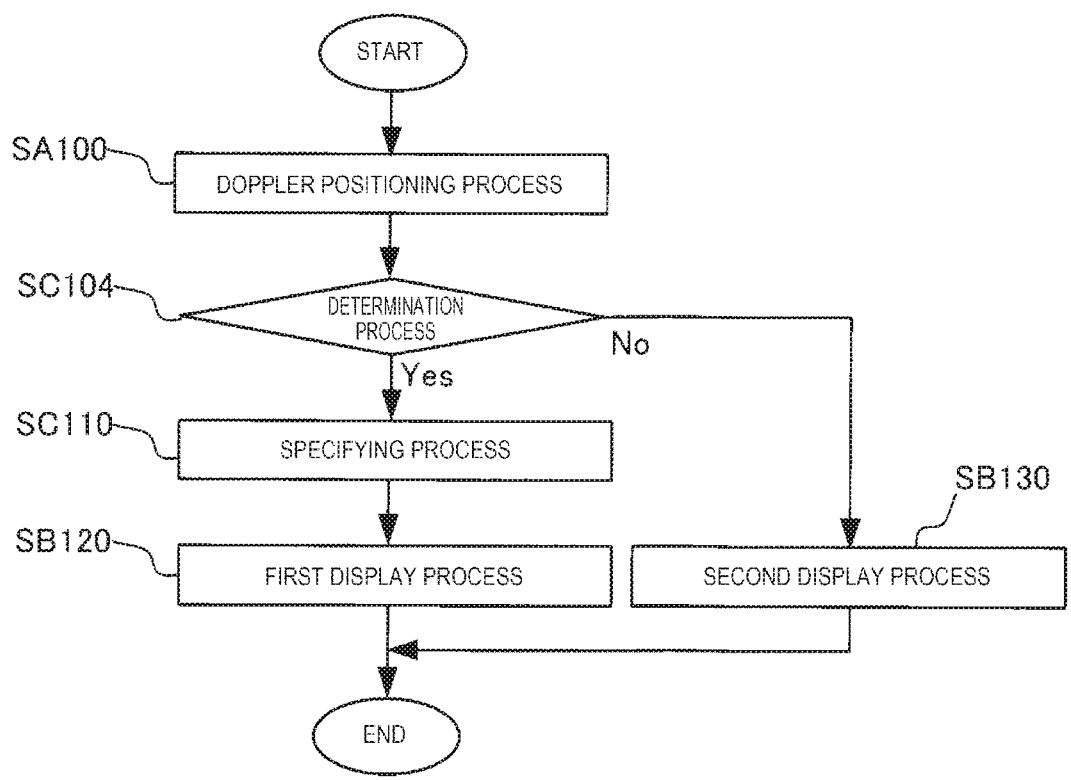
FIG. 10 is a flowchart illustrating a flow of a time display method executed by the processing device according to a program in the electronic device.

The processing device 40 being operated according to the program P3 executes a time display method illustrated in FIG. 10. As illustrated in FIG. 10, the time display method in this embodiment includes the Doppler positioning process SA100, a determination process SC104, a specifying process SC110, the first display process SB120, and the second display process SB130. Hereinafter, the determination process SC104 and the specifying process SC110 that are different from those of the time display method in the second embodiment will be mainly described.

In the determination process SC104, the processing device 40 functions as the verifying portion 420B and determines whether or not the distance from the boundary of the time zone of the position calculated in Doppler positioning process SA100 is equal to or greater than a predetermined threshold value. When the determination result in the determination process SC104 is "Yes", the processing device 40 executes the specifying process SC110 and the first display process SB120. When the determination result of the determination process SC104 is "No", the processing device 40 executes the second display process SB130. In the second display process SB130 of this embodiment, a message indicating that the position obtained by the positioning is not separated from the boundary of the time zone by the predetermined threshold value or more is displayed on the display device 20.

In the specifying process SC110, the processing device 40 functions as the specifying portion 430C. In the specifying process SC110, the processing device 40 specifies the time zone based on the position determined in the determination process SC104 that the distance from the boundary is greater than or equal to the predetermined threshold value. In the first display process B120 subsequent to the specifying process SC110, the processing device 40 functions as the display controller 440B and causes the display device 20 to display the time according to the time zone specified in the specifying process SC110.

As described above, according to the electronic device 1C of this embodiment, when the position obtained by Doppler positioning is separated from the boundary of the time zone by a distance of a predetermined threshold value or more, the time according to the time zone specified based on the position is displayed. If the position obtained by Doppler positioning is separated from the boundary of the time zone by the distance equal to or greater than the predetermined threshold value, the time zone is not erroneously specified even if the error included in the position is taken into consideration. Since the code phase positioning is not performed also in this embodiment, it is possible to display the time according to the time zone while avoiding excessive quality. Also, in this embodiment, the second display process SB130 may be omitted, and when the determination result in the determination process SC104 is "No", a modification may be made such that the second display process SB130 and the specifying process SC110 are executed in addition to the first display process SB120. When the determination result in the determination process SC104 is "No", the code phase positioning may be performed, the time zone may be specified based on the position obtained by the code phase positioning, and the time according to the time zone may be displayed on the display device 20.

4. Modification Example

The following modifications may be appropriately combined with the embodiments described above.

(1) The communication device 10 in each of the embodiments described above is a GPS communication module that receives a radio wave transmitted from the GPS satellite 2. However, the communication device 10 may be a global navigation satellite system (GNSS) communication module that receives a radio wave transmitted from a satellite included in a multi-GNSS, or may be a communication module that receives a radio wave transmitted from a satellite included in other satellite systems such as BeiDou, GLONASS, QZS, and Galileo. In short, the communication device 10 may be any communication module that receives a radio wave transmitted from a satellite included in a satellite system. In each of the embodiments described above, an application example of the present disclosure to a timepiece including the GPS communication module is described. However, an application target of the present disclosure may be an electronic device provided with a communication module that receives the radio wave transmitted from the satellite included in the satellite system, or may be a vehicle-mounted electronic device such as a smartphone, a tablet terminal, or a car navigation device. In the second embodiment, although standard deviation is used as an index value indicating the magnitude of variation in the first code phase, the second code phase, the third code phase, and the fourth code phase, other statistics such as an average value of the first difference, the second difference, the third difference and the fourth difference, a t value, or a p value may be used.

(2) The program P1 in the first embodiment may be manufactured or distributed as a single element. As a specific distribution method of the program P1, a mode in which the program is distributed by being written in a computer-readable recording medium such as a flash read only memory (ROM), or a mode in which the program is distributed by being downloaded through a telecommunication line such as the Internet can be considered. By installing the program in an electronic device that includes a computer such as a CPU and a communication module that receives the radio wave transmitted from the satellite included in the satellite system and operating the computer of the electronic device according to the program, the electronic device can be made to function as the electronic device according to the present disclosure. Similarly, the program P2 in the second embodiment and the program P3 in the third embodiment may be respectively manufactured or distributed as a single element.

(3) The calculator 410, the specifying portion 430A, and the display controller 440A in the first embodiment are software modules. However, part or all of the calculator 410, the specifying portion 430A, and the display controller 440A may be realized by hardware such as a digital signal processor (DSP), an application specific integrated circuit (ASIC), a programmable logic device (PLD), and a field programmable gate array (FPGA). Similarly, part or all of the calculator 410, the verifying portion 420B, the specifying portion 430B, and the display controller 440B in the second embodiment may also be hardware, and part or all of the calculator 410 and the verifying portion 420C, the specifying portion 430C, and the display controller 440B in the third embodiment may also be hardware.

(4) In the first embodiment, the electronic device 1A according to the embodiment of the present disclosure is described. However, the semiconductor IC provided with the calculator 410, the specifying portion 430A, and the display controller 440A may be manufactured or sold as a single element. By incorporating this semiconductor IC into an electronic device including the communication module that receives the radio wave transmitted from the satellite included in the satellite system, the electronic device can be made to function as the electronic device 1A of the first embodiment. Similarly, a semiconductor IC provided with the calculator 410, the verifying portion 420B, the specifying portion 430B, and the display controller 440B may be manufactured or sold as a single element. By incorporating this semiconductor IC into an electronic device including the communication module that receives the radio wave transmitted from the satellite included in the satellite system, the electronic device can be made to function as the electronic device 1B of the second embodiment. A semiconductor IC provided with the calculator 410, the verifying portion 420C, the specifying portion 430C, and the display controller 440B may be manufactured or sold as a single element. By incorporating this semiconductor IC into an electronic device including the communication module that receives the radio wave transmitted from the satellite included in the satellite system, the electronic device can be made to function as the electronic device 1C of the third embodiment.

5. Aspects Grasped from at Least One of the Embodiments and Each Modification Example The present disclosure is not limited to the embodiments and modification examples described above, and can be realized in various aspects without departing from the spirit thereof. For example, the present disclosure can be realized by the following aspects. The technical features in the embodiments described above corresponding to the technical features in each aspect described below can be replaced or combined as appropriate in order to solve part or all of the problems of the present disclosure, or to achieve part or all of the effects of the present disclosure. If the technical features are not described as essential in this specification, the technical features can be appropriately deleted.

The semiconductor IC according to one aspect described above includes a calculator that calculates a position by Doppler positioning using a radio wave transmitted from a satellite, a specifying portion that specifies a time zone based on the position calculated by the calculator, and a display controller that displays a time according to the time zone specified by the specifying portion on a display device. According to this aspect, it is possible to display the time according to the time zone while avoiding excessive quality.

A semiconductor IC according to one aspect described above includes a calculator, a verifying portion, a specifying portion, and a display controller. The calculator calculates a position by Doppler positioning using a radio wave transmitted from a satellite. The verifying portion verifies, using a code phase, whether or not an accuracy of the position calculated by the calculator corresponds to an accuracy that deviates from a time zone. The specifying portion specifies the time zone based on the position that is verified by the verifying portion to have an accuracy that does not deviate from the time zone. The display controller displays the time according to the time zone specified by the specifying portion on a display device. According to this aspect, the accuracy of the position obtained by Doppler positioning is verified based on variation in the code phase, and the time according to the time zone specified based on the verified position is displayed. Also, according to this aspect, it is possible to display the time according to the time zone while avoiding excessive quality.

In the semiconductor IC according to one aspect described above, when the accuracy deviates from the time zone, the display controller may display on the display device that the accuracy deviates from the time zone. According to this aspect, when the accuracy of the position obtained by Doppler positioning deviates from the time zone, it is possible to allow the user to understand that the accuracy deviates from the time zone.

A semiconductor IC according to one aspect described above includes a calculator, a verifying portion, a specifying portion, and a display controller. The calculator calculates a position by Doppler positioning using a radio wave transmitted from a satellite. The verifying portion verifies whether or not a distance from a boundary of a time zone of the position calculated by the calculator is equal to or greater than a predetermined threshold value. The specifying portion specifies the time zone based on the position verified by the verifying portion that the distance from the boundary is equal to or greater than the predetermined threshold value. The display controller displays the time according to the time zone specified by the specifying portion on a display device. If the position obtained by Doppler positioning is separated from the boundary of the time zone by a distance equal to or greater than a predetermined threshold value, the time zone is not erroneously specified even if an error included in the position is taken into consideration. Also, according to this aspect, it is possible to display the time according to the time zone while avoiding excessive quality.

In the semiconductor IC according to one aspect described above, a measurement device that measures a moving speed of a device including the semiconductor IC is further included, and the verifying portion may adjust the threshold value according to the moving speed measured by the measurement device. According to this aspect, the threshold value can be adjusted according to the moving speed of the device including the semiconductor IC.

An electronic device according to one aspect described above includes the semiconductor IC according any one of the aspects described above and a communication module that receives a radio wave transmitted from a satellite.

A time display method according to one aspect described above includes obtaining a position by Doppler positioning using a radio wave from a satellite, specifying a time zone based on the position obtained by the Doppler positioning, and displaying a time according to the specified time zone. Also, according to this aspect, it is possible to display the time according to the time zone while avoiding excessive quality.

A time display method according to one aspect described above includes obtaining a position by Doppler positioning using a radio wave transmitted from a satellite, verifying, using a code phase, whether or not an accuracy of the position obtained by the Doppler positioning corresponds to an accuracy that deviates from the time zone, if the accuracy does not deviate from the time zone, specifying the time zone based on the position obtained by the Doppler positioning, and displaying a time according to the specified time zone. Also, according to this aspect, it is possible to display the time according to the time zone while avoiding excessive quality.

A time display method according to one aspect described above includes obtaining a position by Doppler positioning using a radio wave transmitted from a satellite, verifying whether or not a distance from a boundary of a time zone of the position obtained by the Doppler positioning is equal to or greater than a predetermined threshold value, when the distance from the boundary is equal to or greater than the predetermined threshold value, specifying the time zone based on the position obtained by the Doppler positioning, and displaying a time according to the specified time zone. Also, according to this aspect, it is possible to display the time according to the time zone while avoiding excessive quality.

What is claimed is:

1. A semiconductor IC, comprising:
a calculator configured to calculate a position by Doppler positioning using a radio wave transmitted from a satellite;
a verifying portion configured to:
  calculate an index value based on a position of the satellite and the position calculated by the Doppler positioning;
  determine the index value is one of:
    equal to or less than a predetermined threshold value, or
    larger than the predetermined threshold value;
  determine, based on the determination that the index value is larger than the predetermined threshold value, an accuracy of the position calculated by the Doppler positioning deviates from a time zone; and
  determine, based on the determination that the index value is equal to or less than the predetermined threshold value, the accuracy of the position calculated by the Doppler positioning does not deviate from the time zone;
a specifying portion configured to specify the time zone based on the determination that the accuracy of the position calculated by the Doppler positioning does not deviate from the time zone; and
a display controller configured to:
  display, based on the determination that the index value is equal to or less than the predetermined threshold value, a time according to the specified time zone on a display device; and
  display, based on the determination that the index value is larger than the predetermined threshold value, a message indicating that the accuracy of the position calculated by the Doppler positioning deviates from the time zone.

2. An electronic device, comprising:
the semiconductor IC according to claim 1; and
a communication module configured to receive the radio wave transmitted from the satellite.

3. A semiconductor IC, comprising:
a calculator configured to calculate a position by Doppler positioning using a radio wave transmitted from a satellite;
a verifying portion configured to;
  calculate a first code phase from a position of the satellite and the position calculated by the Doppler positioning;
  obtain a second code phase based on the radio wave transmitted from the satellite;
  calculate a difference between the first code phase and the second code phase;
  calculate an index value based on the calculated difference;
  determine the index value is one of:
    equal to or less than a predetermined threshold value, or
    larger than the predetermined threshold value;
  determine, based on the determination that the index value is larger than the predetermined threshold value, an accuracy of the position calculated by the Doppler positioning deviates from a time zone; and
  determine, based on the determination that the index value is equal to or less than the predetermined threshold value, the accuracy of the position calculated by the Doppler positioning does not deviate from the time zone;
a specifying portion configured to specify the time zone based on the determination that the accuracy of the position calculated by the Doppler positioning does not deviate from the time zone; and
a display controller configured to:
  display, based on the determination that the index value is equal to or less than the predetermined threshold value, a time according to the specified time zone on a display device; and
  display, based on the determination that the index value is larger than the predetermined threshold value, a message indicating that the accuracy of the position calculated by the Doppler positioning deviates from the time zone.

4. A semiconductor IC, comprising:
a calculator configured to calculate a position by Doppler positioning using a radio wave transmitted from a satellite;
a verifying portion configured to determine a distance of the position calculated by the Doppler positioning from a boundary of a time zone is one of:
  equal to or greater than a predetermined threshold value, or
  less than the predetermined threshold value;
a specifying portion configured to specify the time zone based on the determination that the distance of the position calculated by the Doppler positioning from the boundary of the time zone is equal to or greater than the predetermined threshold value;
a display controller configured to:
  display a time according to the specified time zone on a display device based on the determination that the distance of the position calculated by the Doppler positioning from the boundary of the time zone is equal to or greater than the predetermined threshold value; and
  display, based on the determination that the distance of the position calculated by the Doppler positioning from the boundary of the time zone is less than the predetermined threshold value, a message indicating that the position calculated by the Doppler positioning is not separated from the boundary of the time zone by the predetermined threshold value; and a measurement device configured to measure a moving speed of a device that includes the semiconductor IC, wherein the verifying portion is further configured to increase the predetermined threshold value based on an increase in the measured moving speed.

5. A time display method, comprising:

calculating a position by Doppler positioning using a radio wave transmitted from a satellite;

calculating an index value based on a position of the satellite and the position calculated by the Doppler positioning;

determining the index value is one of:
  equal to or less than a predetermined threshold value, or
  larger than the predetermined threshold value;

determining, based on the determination that the index value is larger than the predetermined threshold value, an accuracy of the position calculated by the Doppler positioning deviates from a time zone;

determining, based on the determination that the index value is equal to or less than the predetermined threshold value, the accuracy of the position calculated by the Doppler positioning does not deviate from the time zone;

specifying the time zone based on the determination that the accuracy of the position calculated by the Doppler positioning does not deviate from the time zone;

displaying, based on the determination that the index value is equal to or less than the predetermined threshold value, a time according to the specified time zone; and displaying, based on the determination that the index value is larger than the predetermined threshold value, a message indicating that the accuracy of the position calculated by the Doppler positioning deviates from the time zone.

6. A time display method, comprising:

calculating a position by Doppler positioning using a radio wave transmitted from a satellite;

calculating a first code phase from a position of the satellite and the position calculated by the Doppler positioning;

obtaining a second code phase based on the radio wave transmitted from the satellite;

calculating a difference between the first code phase and the second code phase;

calculating an index value based on the calculated difference;

determining the index value is one of:
  equal to or less than a predetermined threshold value, or
  larger than the predetermined threshold value;

determining, based on the determination that the index value is larger than the predetermined threshold value, an accuracy of the position calculated by the Doppler positioning deviates from a time zone;

determining, based on the determination that the index value is equal to or less than the predetermined threshold value, the accuracy of the position calculated by the Doppler positioning does not deviate from the time zone;

specifying the time zone based on the determination that the accuracy of the position calculated by the Doppler positioning does not deviate from the time zone;

displaying, based on the determination that the index value is equal to or less than the predetermined threshold value, a time according to the specified time zone; and displaying, based on the determination that the index value is larger than the predetermined threshold value, a message indicating that the accuracy of the position calculated by the Doppler positioning deviates from the time zone.

7. A time display method, comprising:

in a semiconductor IC:
  calculating a position by Doppler positioning using a radio wave transmitted from a satellite;
  determining a distance of the position calculated by the Doppler positioning from a boundary of a time zone is one of:
    equal to or greater than a predetermined threshold value, or
    less than the predetermined threshold value;
  specifying the time zone based on the determination that the distance of the position calculated by the Doppler positioning from the boundary of the time zone is equal to or greater than the predetermined threshold value;
  displaying a time according to the specified time zone based on the determination that the distance of the position calculated by the Doppler positioning from the boundary of the time zone is equal to or greater than the predetermined threshold value;
  displaying, based on the determination that the distance of the position calculated by the Doppler positioning from the boundary of the time zone is less than the predetermined threshold value, a message indicating that the position calculated by the Doppler positioning is not separated from the boundary of the time zone by the predetermined threshold value;
  measuring a moving speed of a device that includes the semiconductor IC; and
  increasing the predetermined threshold value based on an increase in the measured moving speed.

* * * * *